United States Patent [19]
Manning et al.

[11] Patent Number: 5,796,189
[45] Date of Patent: Aug. 18, 1998

[54] BRAZING PROCEDURE FOR GENERATOR LIQUID COOLED STATOR BARS

[75] Inventors: Michael Patrick Manning, Watervliet; Robert Timothy Lembke, Amsterdam, both of N.Y.

[73] Assignee: General Electric Co., Schenectady, N.Y.

[21] Appl. No.: 589,923

[22] Filed: Jan. 23, 1996

[51] Int. Cl.$^6$ .................. B23K 1/20; H02K 15/00
[52] U.S. Cl. .................. 310/54; 228/179.1; 228/183; 228/215; 310/70
[58] Field of Search .................. 310/71, 54; 228/183, 228/215, 179.1; 29/890.054

[56] References Cited

U.S. PATENT DOCUMENTS

| | | | |
|---|---|---|---|
| 2,473,887 | 6/1949 | Jennings et al. | 228/215 |
| 3,510,700 | 5/1970 | Grinchenko et al. | 310/54 X |
| 3,551,995 | 1/1971 | Marechal | 228/215 X |
| 4,634,039 | 1/1987 | Banerjee | 228/215 X |
| 5,557,837 | 9/1996 | Thiard-Laforet et al. | 310/54 X |
| 5,581,869 | 12/1996 | Travaly | 310/54 X |

OTHER PUBLICATIONS

Westinghouse document, "Water–Cooled Stator Coil" (undated).

Primary Examiner—Kenneth J. Ramsey
Attorney, Agent, or Firm—Nixon & Vanderhye

[57] ABSTRACT

A method of creating a brazed joint between a plurality of solid and hollow strands of a stator bar and a stator bar end fitting comprising the steps of:

a) inserting between free ends of the plurality of solid and hollow strands a preformed braze alloy such that the braze alloy is at least flush with the free ends of the hollow and solid strands;

b) applying stop off material to free end edges of at least the hollow strands;

c) inserting the solid and hollow strands and preformed braze alloy in an opening of a stator bar end fitting;

d) heating the braze alloy to cause the braze alloy to flow about and between the solid and hollow strands and between the fitting and the solid and hollow strands, but wherein the stop off material prevents flow of braze alloy onto the free end edges of the hollow strands.

8 Claims, 4 Drawing Sheets

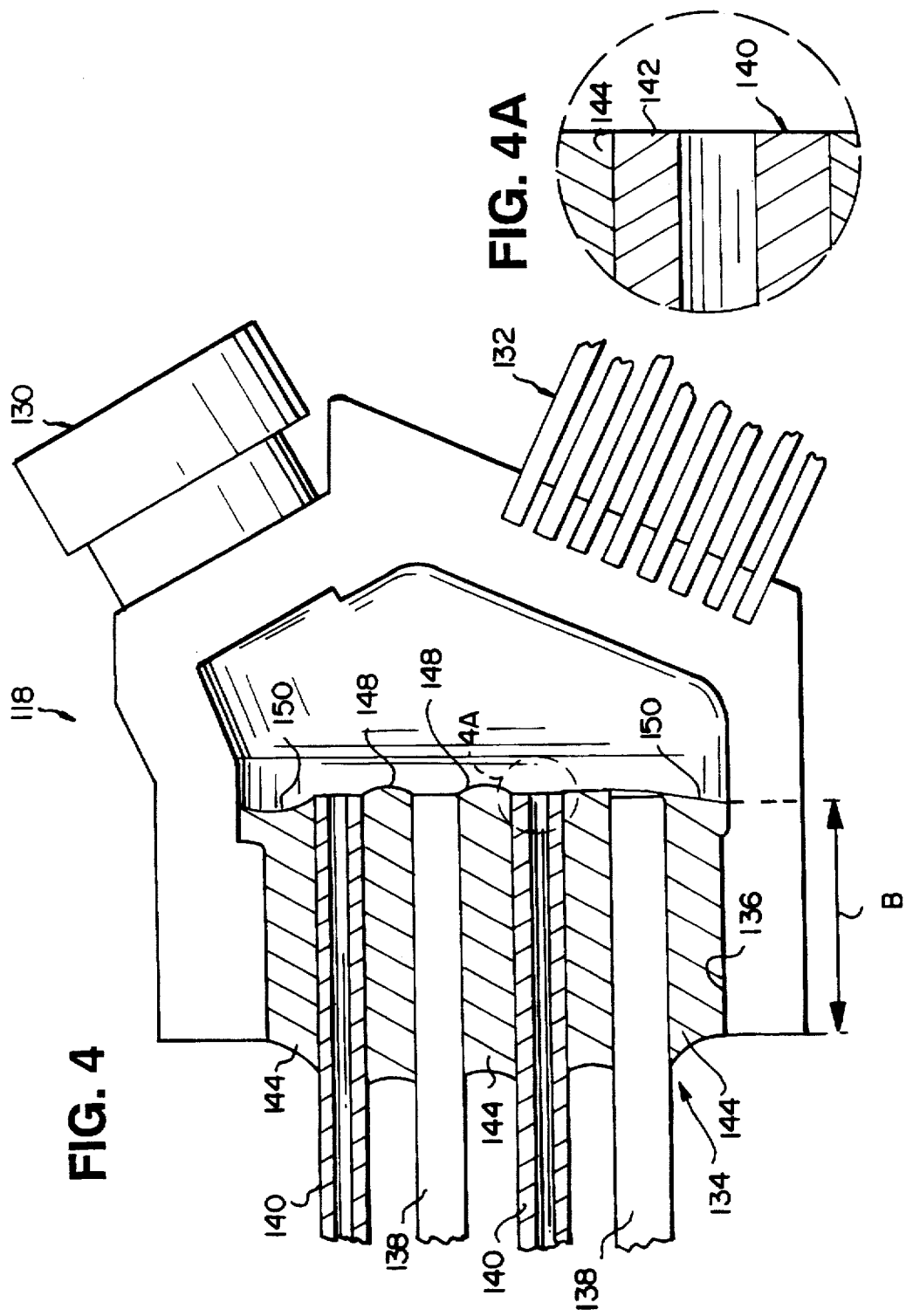

BRAZING PROCEDURE FOR GENERATOR LIQUID COOLED STATOR BARS

TECHNICAL FIELD

This invention relates to a brazing process for improving the joint between a hydraulic fitting and a stator bar in a liquid cooled generator.

BACKGROUND PRIOR ART

Water cooled stator bar end connections are composed of many small, rectangular solid and hollow copper strands, which make up the stator bar. These strands are brazed into a copper hydraulic fitting which provides both electrical and hydraulic couplings. The concerns with the brazing process and resulting joint are primarily with hydraulic integrity. Experience with the brazing process shows that completely sound brazes are difficult to achieve because of the large surface area, and because of an inability to feed braze alloy into the joint during solidification. Consequently, porosity can occur in joints or at the joint surface which may result in rework or scrapping of the stator bars, and which may also create conditions for subsequent corrosion and/or erosion during service.

To prevent excess braze alloy from obstructing the open ends of the hollow strands, it is necessary to keep the braze alloy back away from the ends of the strands inside the fitting. This, however, creates a joint of solidified braze alloy with copper strands projecting out beyond the joint surface. This makes it difficult for inspection and does not guarantee that molten braze alloy will not flow up to the ends of and into the hollow strands.

Finally, there have been numerous confirmed leaks, some of which have been repaired but others of which have required stator bar replacement. Prior work investigating the leak mechanisms has been limited to examination of a limited number of stator bars, and has not yielded a complete understanding of the causes. Based on the results generated in recent tests, however, the leak mechanism is believed to be due to a two-part corrosion process which initiates at the surface of the brazed joint. The initiation of this phase requires stagnant water in relatively small cavities. Such cavities are present in the conventional brazing process as a result of concave brazed joint surfaces between adjacent strands. A conventional brazed joint for a generator liquid cooled stator bar is illustrated in FIG. 1 and will be described in greater detail hereinbelow.

DISCLOSURE OF THE INVENTION

The objective of this invention is twofold: (1) to improve the manufacturing process as it relates to the joint between a hydraulic fitting and stator bar; and (2) to prevent service failures in the form of liquid leaks at such joints.

In the new improved brazing procedure in accordance with this invention, stop-off material is first applied to the end edges of the hollow strands to prevent the flow of molten braze alloy on the end edges, thus preventing clogging or plugging of the hollow strands. The preformed and pre-placed alloy is located flush with the ends of the strands (the ends of all strands, hollow and solid, are also substantially flush with each other), and thus the size of the preformed alloy can be increased to fill the additional joint volume created. During heating, the braze alloy flows to fill the spaces between the individual strands and between the strand package and the inner wall of the hydraulic fitting. This creates a brazed joint surface which is flush or extends slightly beyond the hollow strand openings, and therefore, the brazed joint can be maximized in length. By eliminating the concave braze alloy joint surfaces, corrosion as a leak factor due to stagnant water in such concave surfaces is also eliminated. In addition, the stop off material not only prevents plugging of the hollow strands, but also creates a buildup above the ends of the strands which prevents shrinkage porosity during cooling. Finally, the finished joint in accordance with this invention can be inspected easily.

Accordingly, in its broader aspects, the present invention relates to a method of creating a brazed joint between a plurality of solid and hollow strands of a stator bar and a stator bar end fitting comprising the steps of:

a) inserting between free ends of the plurality of solid and hollow strands a preformed braze alloy such that the braze alloy is at least flush with the free ends of the hollow and solid strands;

b) applying stop off material to free end edges of at least the hollow strands;

c) inserting the solid and hollow strands and preformed braze alloy in an opening of a stator bar end fitting;

d) heating the braze alloy to cause the braze alloy to flow about the individual solid and hollow strands, and between an interior wall of the fitting and the solid and hollow strands, and wherein said stop off material prevents flow of braze alloy onto the free end edges of the hollow strands.

In another aspect, the invention relates to a brazed joint between a stator bar and an end fitting comprising a plurality of hollow and solid strands arranged in an array, the array having a first cross-sectional shape; an opening in the end fitting, the opening having a shape complementary to the first shape, the array received in the opening; and a braze alloy joining free ends of the hollow and solid strands to each other and to an internal surface of the end fitting; the braze alloy lying at least substantially flush with the free ends.

Additional objects and advantages of the subject invention will become apparent from the detailed description which follows.

BRIEF DESCRIPTION OF THE DRAWINGS

FIG. 4 is a partial section similar to FIG. 2 but incorporating the improved brazed joint of this invention; and FIG. 4A is an enlarged detail taken from FIG. 4.

BEST MODE FOR CARRYING OUT THE INVENTION

Figure 1:
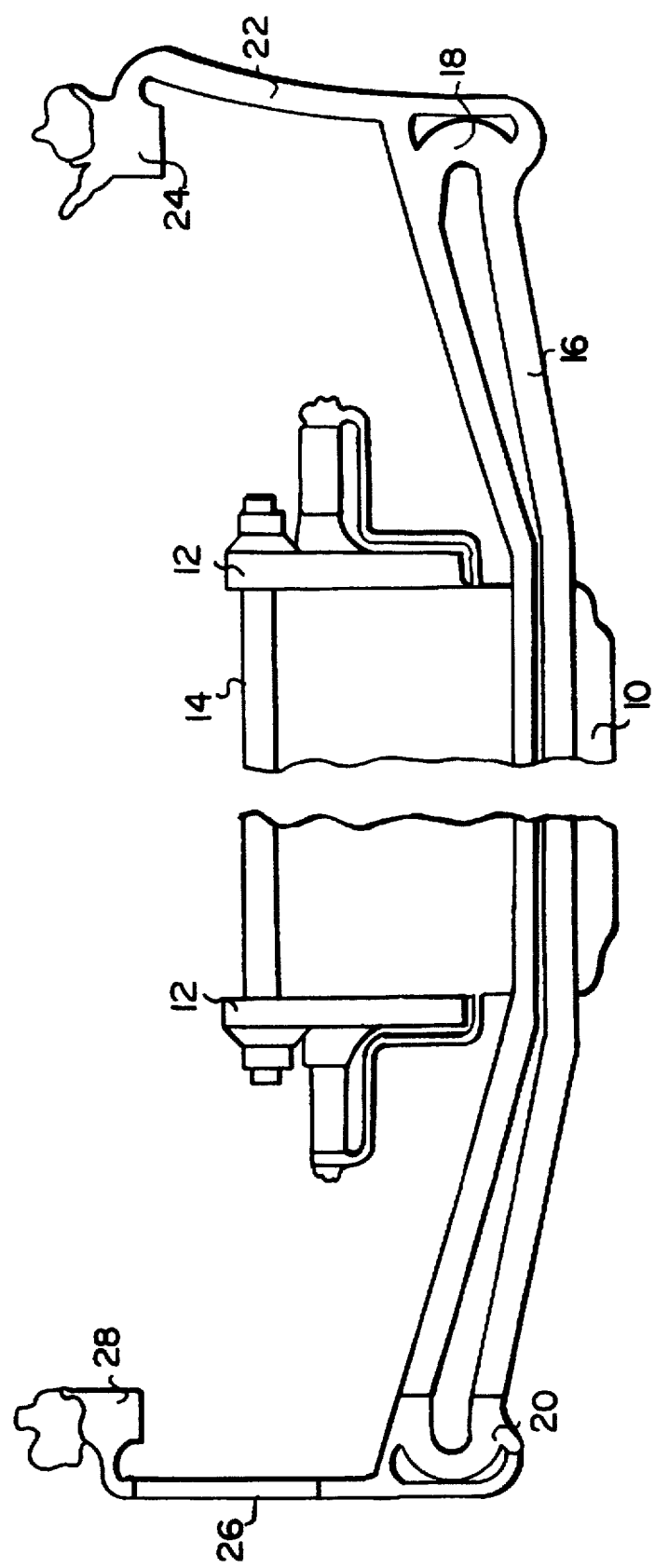
FIG. 1 is a schematic illustration of a liquid-cooled stator winding arrangement illustrating the stator bars and end fittings coupled to inlet and outlet coolant headers.

Referring now to the drawings, particularly to FIG. 1, there is illustrated a liquid-cooled stator winding arrangement used in a typical liquid-cooled generator. A stator core 10 having stator core flanges 12 and core ribs 14 are illustrated, with stator bars 16 passing through radially extending slots in the stator core 10 and terminating at opposite ends in inlet and outlet end fittings 18 and 20, respectively. Inlet hoses 22 connect inlet end fitting 18 to an inlet coolant header 24. Outlet hoses 26 connect the outlet end fitting 20 to an outlet coolant header 28. The fittings 18 and 20 are formed of an electrically conductive material such as copper.

Figure 2:
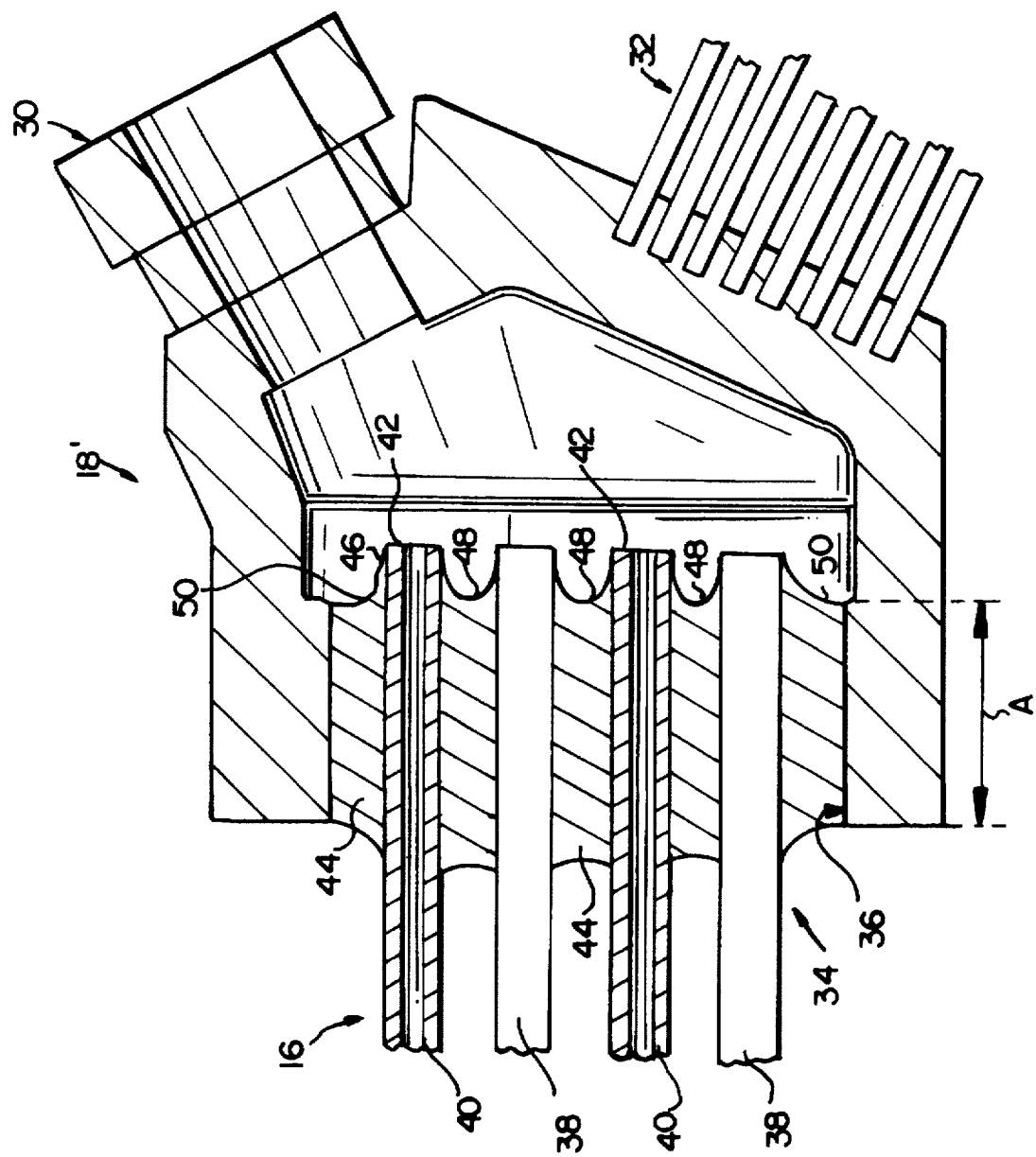
FIG. 2 is a partial section through a conventional brazed joint between stator bar strands and a hydraulic fitting.

With reference to FIG. 2, a conventional joint between an end fitting 18' and stator bar 16 is illustrated. Specifically, the hydraulic end fitting 18' includes a coolant (water) coupling 30 and an electrical connector 32. The hydraulic end fitting also includes an opening 34 defined by a peripheral wall 36 by which the fitting is secured to the stator bar 16.

The stator bar end connections are composed of many small rectangular solid and hollow copper strands 38, 40, respectively, which make up the stator bar 16 and which are brazed into the copper hydraulic fitting 18'.

Figure 3:
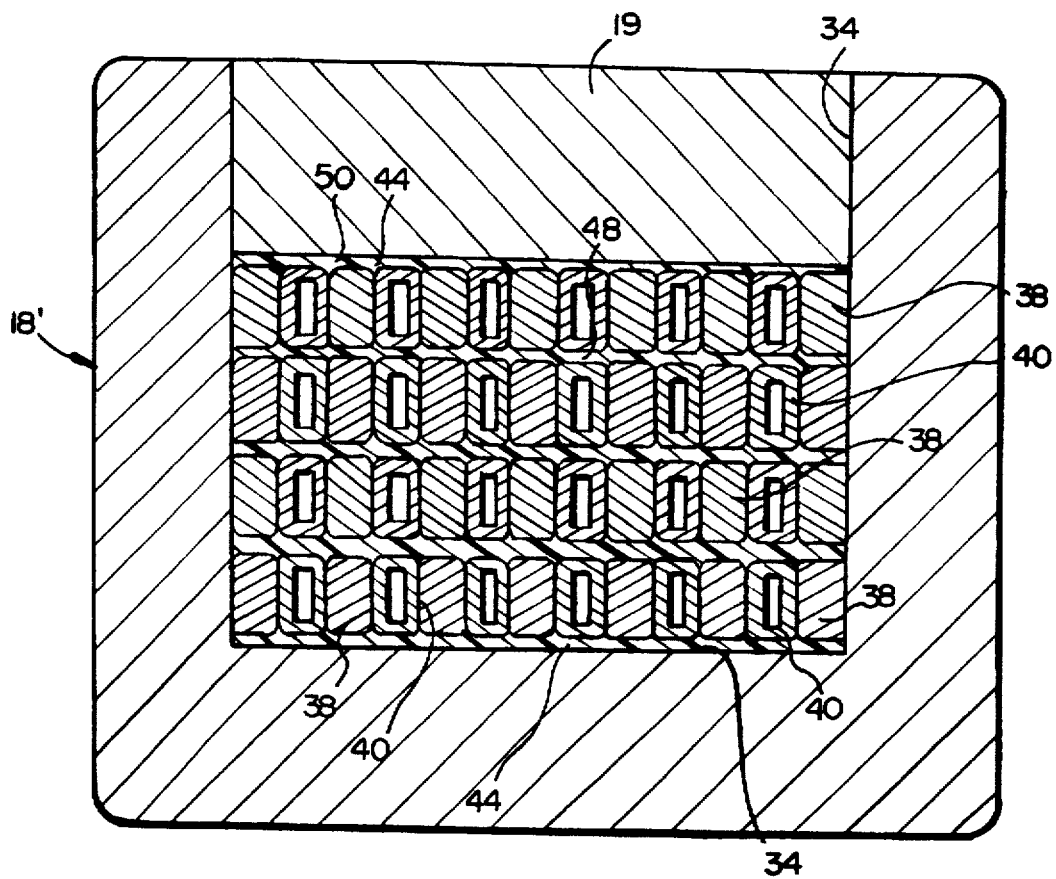
FIG. 3 is a partial section of the joint illustrated in FIG. 2.

As best seen in FIG. 3, each stator bar 16 includes a rectangular array of the solid and hollow copper strands 38, 40, respectively, disposed in side-by-side and superposed relation one to the other. The array may be compressed within the hydraulic end fitting 18' by means of a plug 19 fitted within a similarly shaped "window" cut-out of the fitting. The rows of strands 38, 40 within the stator bar are brazed to one another as well as to the interior wall 36 of the end fitting 18'. The braze alloy 44 preferably comprises a copper phosphorous alloy similar to AWS A5.8, BCuP-1.

In the conventional method, a preformed layer of brazing alloy 44 is placed between the ends of the strands 38, 40, and is located a prescribed distance from the ends of the strands. This preformed alloy 44 is sized to provide a brazed joint with a defined thickness while the length of the brazed joint is restricted by the allowable space inside the fitting 18" and is complementary in shape to opening 34. During heating, the alloy 44 is allowed to flow and fill spaces between individual rows of strands and between the strand package and the inner wall 36 of the fitting 18. When flowing, the braze alloy will travel along the sides of the strands, often reaching the ends of the strands as shown at 46 in FIG. 2. This leads to potential plugging of the hollow strands as the braze alloy flows along end edges 42 and into the hollow interior of the strands 40. This method also creates natural concave pockets 48 between adjacent strands 38, 40, and between the upper and lower strands and the hydraulic end fitting 18' as shown at 50. As explained earlier, such concave pockets can lead to water stagnation and subsequent two-part corrosion process which can lead to stator bar failure.

With reference now to FIGS. 4 and 4A, the improved braze joint for generator liquid cooled stator bars in accordance with this invention is illustrated. For convenience, reference numerals similar to those used in FIG. 2 are used in FIG. 4 for corresponding elements, but with the prefix "1" added. It will be noted initially that the hydraulic end fitting 118 is identical to the fitting 18' shown in FIG. 2. Solid strands 138 and hollow strands 140 are also arranged in the same manner as the strands 38, 40 in FIG. 2. The improved joint relates specifically to the brazing procedure described in detail below.

In the improved method, conventional "stop-off" material such as, but not limited to, a product sold under the brand name "Nicrobraz" by Wall Colmonoy Corporation, which prevents flow of the molten braze alloy, is placed on the end edges 142 of the hollow strands 140 to prevent the flow of molten braze alloy on these end surfaces, so as to prevent potential plugging of the hollow strands 140.

The preformed braze alloy 144 is then located flush with the ends of the strands 138, 140 as shown in FIG. 4. The amount of alloy is increased by making the braze preform wider to fill the additional joint volume created, and notice in this regard that the length of the joint indicated by dimension B in FIG. 4 is greater than the corresponding dimension A in FIG. 2. During heating, the braze alloy 144 flows and fills the spaces as described previously. In accordance with this invention, however, the brazed joint surface is flush with, or projects slightly beyond, the hollow strand openings. In other words, the braze alloy 144 between the strands 138, 140 projects slightly from the ends of the strands by reason of the convex shape of the joint surface as shown at 148 and 150. As a result, the concave pockets 50 have been substantially eliminated in favor of flush or slightly convex braze alloy surfaces. This procedure also extends the brazed joint to its maximum possible length as already indicated above.

It should also be noted that the stop-off material on end edges 142 not only keeps the braze alloy 144 away from the openings in the hollow strands 140, but also often creates a buildup above the ends of the strands. This prevents shrinkage porosity during cooling. The twofold objective of the invention is therefore achieved and, in addition, the finished joint in accordance with the above procedure can be easily inspected since the entire joint surface is exposed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. In particular, the subject invention is not limited in its application to stator bar end fittings of any particular shape or configuration but, rather, is applicable to a wide range of end fitting designs.

What is claimed is:

1. A method of creating a brazed joint between a plurality of solid and hollow strands of a stator bar and a stator bar end fitting comprising the steps of:
    a) inserting between free ends of the plurality of solid and hollow strands a preformed braze alloy such that said braze alloy is at least flush with the free ends of said solid and hollow strands;
    b) applying stop off material to free end edges of at least said hollow strands;
    c) inserting the solid and hollow strands and preformed braze alloy in an opening of a stator bar end fitting;
    d) heating said braze alloy to cause said braze alloy to flow about said solid and hollow strands and between an interior wall of said fitting and said solid and hollow strands, and wherein said stop off material prevents flow of braze alloy onto said free end edges of said hollow strands.

2. The method of claim 1 wherein said braze alloy projects beyond said free end edges.

3. The method of claim 1 wherein said brazing alloy is a copper phosphorus alloy.

4. The method of claim 1 wherein said opening in said stator bar end fitting is substantially rectangular in shape, and wherein said preformed braze alloy has a substantially complementary shape.

5. A brazed joint between a stator bar and an end fitting comprising:
    a plurality of solid and hollow strands arranged in an array, said strands having free ends in substantially flush relationship with each other, and said array having a first cross-sectional shape;
    an opening in the end fitting, the opening having a shape complementary to said first shape, said array received in said opening; and
    a braze alloy joining free ends of said solid and hollow strands to each other and to an internal surface of said end fitting; said braze alloy lying at least substantially flush with said free ends, and wherein end edges of said hollow strands are coated with stop-off material to limit the flow of braze alloy on said end edges.

6. The brazed joint of claim 5 wherein said braze alloy projects convexly beyond said free ends.

7. The brazed joint of claim 5 wherein said brazing alloy is a copper phosphorus alloy.

8. The brazed joint of claim 5 wherein said cross-sectional shape is substantially rectangular.

* * * * *